UNITED STATES PATENT OFFICE 2,457,255

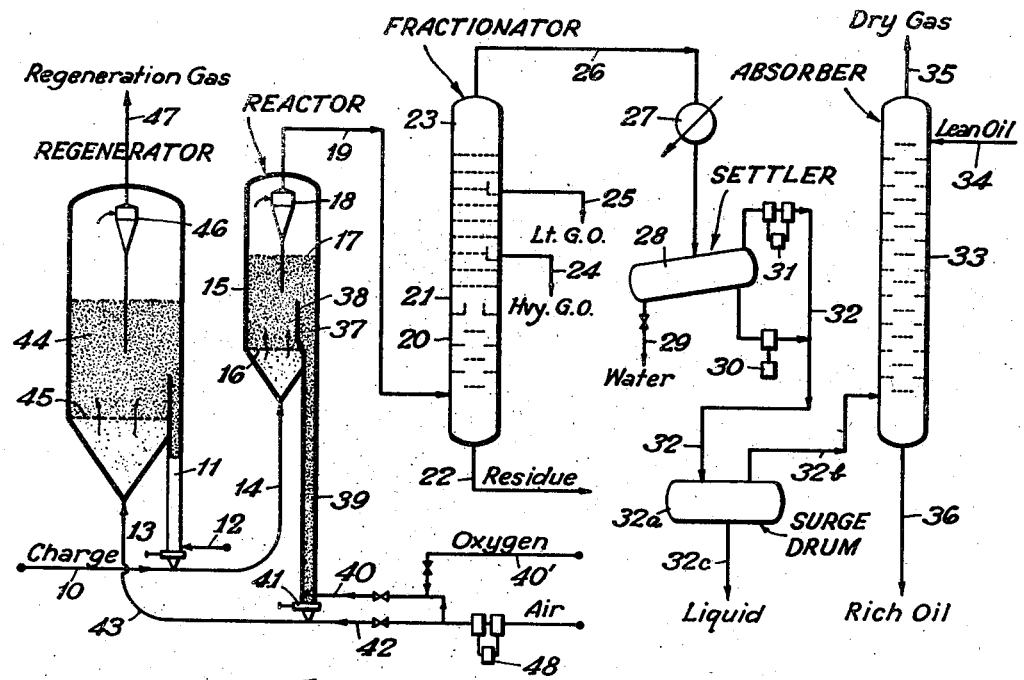
Fig. 1
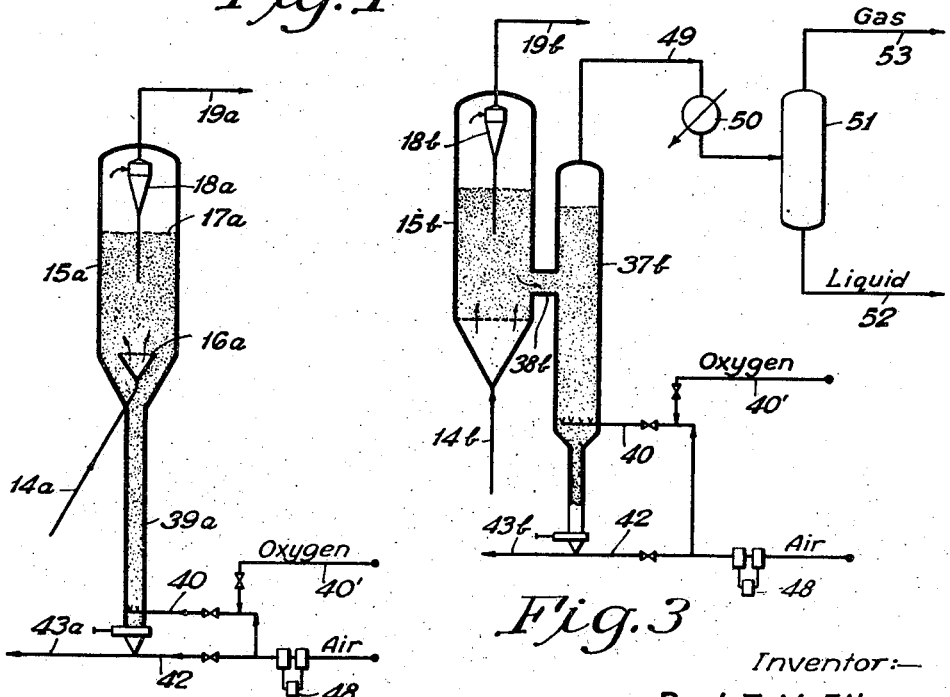
Fig. 2
Fig. 3
Inventor:—
Paul F. McElherne
By Donald E. Payne
Attorney

STRIPPING OF SPENT CATALYST IN A HYDROCARBON CONVERSION PROCESS

Paul F. McElherne, Chicago, Ill., assignor to Standard Oil Company, Chicago, Ill., a corporation of Indiana Application April 20, 1945, Serial No. 589,337

3 Claims. (Cl. 196—52)

This invention relates to an improved catalytic conversion process and it pertains more particularly to a method and means for improving the efficiency of a hydrocarbon conversion process such as catalytic cracking by the use of a new stripping technique.

The invention is applicable to any catalytic conversion system wherein combustible deposits accumulate on the catalyst in a conversion zone and are burned therefrom in a regeneration zone and wherein valuable components are recovered from deposit-containing catalyst by a stripping operation preceding the regeneration step. The invention is particularly applicable to hydrocarbon conversion processes such as catalytic cracking, reforming, isoforming, isomerization, hydrogenation, dehydrogenation, desulfurization, aromatization, etc. and will be herein described as applied to catalytic cracking. The invention is applicable to any system wherein a mass of catalyst is moved through a stripping zone en route from a conversion zone to a regeneration zone. It is thus applicable to moving bed conversion systems but will be described herein as applied to the fluid catalytic cracking system wherein the catalyst solids are of small particle size and vertical gas or vapor velocities are employed in the reaction, regeneration and stripping zones to maintain the catalyst solids therein in suspended, dense phase, fluidized or liquid-like condition.

An object of my invention is to decrease the amount of carbonaceous material that has to be burned in the regenerator, and to decrease the total amount of compressed air required by the system. Another object is to avoid undue degradation of charging stock to coke or, in other words, to markedly increase the recovery of valuable conversion products. A further object is to prolong catalyst life and to maintain catalyst activity at a higher level than was heretofore possible. A further object is to increase the capacity or possible throughput of a system of given size.

A further object of my invention is to increase the efficiency and effectiveness of the stripping operation per se. Still another object is to provide greater flexibility of operation and ease of control. Other objects will be apparent as the detailed description of the invention proceeds.

In moving bed and fluid processes of hydrocarbon conversion spent catalyst from the conversion zone has heretofore been stripped with steam before being returned to the regenerator. In many cases steam is detrimental to catalyst activity and catalyst life but the amount of steam present in combustion gases (e. g. in the regenerator) may not adversely affect the catalyst if the burning or regeneration temperature is held within safe limits. Inert gases such as nitrogen, oxygen-free flue gas, fuel gas, etc. have been proposed as a substitute for steam in order to avoid catalyst injury but it has always been considered that stripping gas should not contain any appreciable amount of free oxygen. In my process I employ free oxygen in the stripping zone and I use it in as high a concentration as it can readily and economically be obtained.

In most cases compressed air is available (for use in the regenerator) and I simply by-pass a small amount of this air or oxygen-rich gas into the base of the stripper, an amount, for example, of the order of about 100 cubic feet or more of air per ton of catalyst passing through the stripper. All gas volumes herein referred to are measured at 60° F. and atmospheric pressure. The oxygen so introduced burns a portion of the carbonaceous material from the catalyst in the bottom of the stripping zone, increasing its temperature by 25 to 200° F. or more, for example, about 25 to 50° F. The heat of combustion and the hot upflowing gases heat the downwardly moving catalyst particles in the stripper before they enter the combustion zone itself, thereby establishing and maintaining a temperature gradient from the bottom to the top of the stripping zone. The upflowing hot gases displace gases introduced into the stripper with the catalyst, strip out vaporizable and removable hydrocarbons, and displace or carry them upwardly into the conversion zone or to a separate recovery system. The most volatile components are removed in the upper part of the stripper, and heavier and heavier components are removed as the catalyst gets hotter and hotter in its approach toward the combustion zone at the base of the stripper. When the catalyst finally reaches the base of the stripper substantially all of the valuable hydrocarbons have been removed therefrom, the recovery of such hydrocarbons being remarkably more complete than the recovery effected by steam or other stripping gases. I have discovered for example that by raising the outlet temperature of the stripper from 800 to 900° F. while cracking at about 800° F., coke yields were reduced by approximately 1% based on charging stock.

The carbonaceous deposits which accumulate on catalyst in catalytic cracking systems is usually characterized by a hydrogen content of about 8 to 10%. When steam or other inert gas is employed for stripping, the carbonaceous residue on the stripped catalyst may still contain approximately this amount of hydrogen when it enters the regeneration zone. In my process the hydrogen-rich components of the catalyst deposits are more extensively removed in the stripping zone itself and a considerable portion of the remaining hydrogen content is burned in the base of the stripping zone. The resulting steam is readily removed from recovered products by simple condensation and places no additional load on the compressors, absorber, etc. of the product recovery system. Most of the combustion, however, results in the formation of carbon dioxide and carbon monoxide together with the steam formed by hydrogen combustion. The nitrogen present in introduced air is of course inert, but after combustion, the nitrogen present is considered as being a component of the combustion gases. Approximately .9 volume of gas per volume of fluidized catalyst passes downwardly from the base of the stripper with the catalyst (since the aerated catalyst is characterized by about 90% free space occupied by gas). Thus when less than 100 cubic feet of oxygen-containing gas is introduced into the stripper per ton of catalyst passing therethrough, substantially all of the combustion products may pass downwardly and thus impose no additional load on the product recovery system. It is only amounts of gas in excess of this approximately .9 volume per volume of fluidized cycled catalyst that must pass upwardly into the reactor and/or product recovery system.

In a catalytic cracking system charging about 7000 barrels per day of gas oil the amount of catalyst circulation through each part of the system per day may be approximately 12,000 to 15,000 tons. As this enormous amount of catalyst passes from the regenerator to the reactor it carries with it from the regenerator a certain amount of flue gas which passes through the reactor and is separated from liquid reaction products at the top of the absorber. That portion of the combustion products produced in the base of my stripper which passes upwardly and into the reactor may be handled in the same way, I prefer to operate under such conditions that the bulk of the combustion products produced in the stripper simply displace hydrocarbon gases or vapors in which the entering spent catalyst is suspended so that such combustion products are largely, if not entirely, withdrawn with stripped catalyst from the base of the stripper. This avoids any appreciable increase in the load on the absorber or on compressors charging gas thereto. Many of the objects of the invention may be accomplished, however, when relatively large amounts of the combustion gas pass upwardly through the stripper.

An outstanding feature of my invention is the small amount of oxygen necessary for introduction into the stripper. When air is employed I require only about 100 to 500, for example about 200 or 300, cubic feet per ton of catalyst cycled. By by-passing such amounts of air per ton of cycled catalyst to the base of the stripping zone, the total air requirement (for both stripping and regeneration) may be reduced by several hundred cubic feet per ton of catalyst cycled. In a 7000 barrel per day plant circulating about 12,000 to 15,000 tons per day of catalyst it will be seen that enormous savings may be effected in air compression costs alone. The outstanding advantages of my process, however, are the increased product yields obtainable, the higher catalyst activity and longer catalyst life and the greatly decreased load required on the regenerator. The total capacity or throughput of any given plant may thus be greatly increased by the use of my improved stripping operation.

The invention will be more clearly understood from the following detailed description of a specific example read in conjunction with the accompanying drawings which form a part of the specification and in which Figure 1 is a schematic flow diagram of my improved catalytic conversion system, Figure 2 is a schematic elevational section through a modified reactor-stripper arrangement and Figure 3 is a further modification of a reactor-stripper arrangement for separate recovery of stripped materials.

As a specific example of the application of my invention I will describe its use in a 7000–7500 barrel per day catalytic cracking plant employing conventional synthetic silica-alumina catalyst in powdered form with a particle size chiefly within the range of about 10 to 100 microns. The catalyst may be of the type for example described in U. S. Patent 2,337,684 and further description thereof is therefore unnecessary. The cracking plant may be of the type described in minute detail in "The Petroleum Engineer," volume 16, No. 4 (January 1945) pages 59–66.

About 7000 barrels per day of gas oil charging stock is introduced through line 10 at a temperature of about 714° F. It picks up hot regenerated catalyst from the base of standpipe 11, the catalyst in this standpipe being maintained in aerated condition by the introduction of aeration gas through line 12 and catalyst being withdrawn in amounts regulated by slide valve 13 to give a catalyst-to-oil weight ratio of about 10:1 to 11:1 in the suspension which is introduced through transfer line 14 to reactor 15. Preferably about 7.5 weight percent of steam is introduced with the charging stock. The suspension is introduced into the reactor through grid 16 for equal distribution thereof and the gaseous stream flows upwardly in the reactor at a velocity of about 1 to 2 feet per second for maintaining the catalyst therein in dense phase turbulent condition. The reactor bed temperature is maintained, by the sensible heat contained in the circulating catalyst, at about 933° F. and the space velocity in this particular case is approximately 0.5 to 0.6 pound of oil charged per hour per pound of catalyst holdup in the reactor. The bulk density of the catalyst in the reactor may be about 15 to 18 pounds per cubic foot. Above the dense phase level 17 there is a dilute phase and entrained catalyst particles are knocked back from the dilute phase to the dense phase by cyclone separator 18 and the dip leg depending therefrom. The pressure at the top of the reactor may be about 8 to 10 pounds per square inch gauge, i. e. sufficient to pass the product stream through the scrubber and fractionator.

The product stream is introduced by line 19 to a low point in scrubber 20 which forms the lower part of fractionating tower 21. At least a part of the residue leaving the base of the scrubber through line 22 is cooled and returned to the upper part of the scrubbing zone for effecting condensation of the heaviest components in the product stream and effectively recovering solids from said stream. In this particular case the residue from line 22 (about 700 barrels per day) together with solids contained therein is returned to charge stock 10 and recycled.

Gas oil and lighter product passes upwardly through the fractionating section 23 of tower 21, heavy gas oil being withdrawn through line 24 and light gas oil through line 25. The overhead leaves fractionating section 23 through line 26, is cooled in condenser 27 and introduced into settler 28 from which condensed water may be withdrawn through line 29. Condensed liquid oil is pumped from the settler by pump 30 and gases from the settler are compressed by compressor 31 to a pressure of approximately 50 to 150 pounds per square inch (2 or more stages of compression, settling and water withdrawal may be employed) the combined streams then being introduced into a surge drum 32a. Gases from the surge drum are introduced by line 32b at a low point in absorber 33 into which a lean oil is introduced through line 34. Liquid withdrawn through line 32c from surge drum 32a may be introduced to said absorber, or it may be introduced into a fractionator or still for providing lean oil for the absorber. A dry gas stream or tail gas is taken overhead from the top of the absorber through line 35, this gas stream containing carbon monoxide, carbon dioxide, hydrogen, methane, ethane, ethylene, etc. When sulfur-bearing stocks are charged the tail gases may contain hydrogen sulfide, but they will not contain any appreciable amount of sulfur dioxide. The rich oil containing propylene and higher boiling components is withdrawn through line 36 for further fractionation, stabilization, etc. No invention is claimed in the product recovery system and it is therefore not described in complete detail, the above portion of the system being referred to since it illustrates the method of eliminating any flue gas produced in the stripping zone which may pass upwardly therethrough and require removal from the product stream.

The catalyst in reactor 15 becomes coated with carbonaceous deposits and such coated catalyst material is continuously withdrawn directly from the dense phase into a stripping zone 37 which in this case is formed by a partition or conduit 38 extending upwardly into the reactor and a standpipe 39 depending downwardly from the reactor. This standpipe and the portion of the reactor partitioned off by baffle or conduit 38 may be about 10 to 20 square feet or more in cross-sectional area and upwards of 10 feet, preferably upwards of 20 feet or more, in height. The dense phase solids may thus flow downwardly through this stripping zone at a velocity of the order of about 1 foot per second. The upward vertical velocity of stripping gases is sufficiently low to maintain the bulk density of the catalyst in this particular case at about 20 pounds per cubic foot, the stripping gas being introduced through line 40.

Catalyst is withdrawn from the base of the stripping zone or from a standpipe depending therefrom in amounts regulated by slide valve 41, picked up by compressed air from line 42 and conveyed by conduit 43 to the base of regenerator 44. About 8.8 tons per minute of catalyst is thus returned to the regenerator along with approximately 20,000 cubic feet per minute of air. The suspension of hot spent catalyst in the incoming air is distributed in the regenerator by means of grid 45 and the vertical gas velocity in the regenerator is maintained at approximately 1 to 1.5 foot per second with a regenerator top pressure of about 4 to 5 pounds per square inch (gauge) and an average regeneration temperature of about 1040° F. Temperature control in the regenerator may be effected by cycling a portion of the catalyst therefrom to a cooler and thence back to the regenerator but in accordance with my invention less cooling is required than has heretofore been necessary because of the lesser amounts of coke which must be burned in the system. The catalyst hold-up in the regenerator will be about 185 to 190 tons and the bulk densities of the catalyst in the regenerator may be of the order of 18 to 20 pounds per cubic foot.

Regeneration gases from the dilute phase above the dense phase in the regenerator may be passed through cyclone separator 46 in order that entrained solids may be returned through the cyclone dip leg to the dense phase and the gases may then be passed through a waste heat boiler and a Cottrell precipitator to the flue gas stack. Water may be introduced into the dilute regeneration gases phase for cooling and preventing after burning and ammonia may be introduced into the gases leaving the regenerator to improve the separation of catalyst fines in the Cottrell precipitator. No invention is claimed in any of these features and in the schematic drawing I simply illustrate the withdrawal of regeneration gases through line 47. Regenerated catalyst is continuously withdrawn from the dense catalyst phase in the regenerator and returned by standpipe 11 for suspension in incoming charging stock as herein described.

When steam was employed as a stripping gas in line 40, the carbonaceous deposit on catalyst leaving the stripper amounted to approximately 1.5% by weight based on catalyst and about 8.5% of such carbonaceous deposit was hydrogen. Approximately 8,600 pounds per hour of carbonaceous deposit was burned from the coke in the regenerator and the regenerated catalyst had a carbon content of about 0.7 to about 0.8% by weight. By the use of my invention the amount of carbonaceous deposit on spent catalyst leaving the reactor may be reduced by as much as 10 to 30% or more thus greatly decreasing the compressed air requirement and regeneration load and increasing the yield of valuable hydrocarbon products recovered.

Instead of introducing steam through line 40 I can simply bypass about 800 to 3000 cubic feet per minute of air from the discharge side of air compressor 48. In other words, I introduce into the base of the stripper about 200 to 300 cubic feet of air per ton of catalyst passing downwardly through the stripper. This amounts to introducing about 40 to 60 cubic feet of oxygen per ton of spent catalyst and the combustion of carbonaceous deposits with this amount of oxygen generates sufficient heat to raise the temperature of the catalyst about 25 to 75° F. so that the temperature at the base of the stripping zone may be of the order of about 1000° F. The combustion in the base of the stripping zone heats the down-flowing catalyst so that a temperature gradient is established which may range for example from about 1000° F. or more at the base of the stripping zone to approximately 940 to 950° F. at the upper part thereof. This temperature gradient is remarkably effective in removing heavier and heavier materials as the catalyst proceeds downwardly in the stripping zone.

The stripping gases are hydrocarbons liberated from the down-flowing solids along with a portion of the hot combustion products from the base of the stripping zone. The hot catalyst from the base of the stripping zone, which carries almost an equal volume of hot combustion products, is picked up in compressed air which is initially at a temperature of only about 200 to 250° F. and the amount of combustion which takes place in transfer line 43 usually presents no particular problem. Such transfer line may be externally cooled when particularly high temperatures are employed in the base of the stripping zone. Alternatively relatively cool regenerated catalyst may be admixed with the compressed air in line 42 before it picks up hot catalyst from the base of the stripping zone in order to provide adequate temperature control in transfer line 43.

The particular temperature to which a catalyst may be safely heated depends to a considerable extent on the catalyst composition. For Super Filtrol it is usually desirable to maintain burning or regeneration temperatures below 1150° F., temperatures below 1100 or 1050° F. being still more desirable. Synthetic silica-alumina catalysts will withstand higher temperatures, e. g. of the order of 1200° F. or higher. The temperatures to which catalyst is heated in the base of my stripping zone is preferably as high a temperature as can be readily attained in available equipment provided that such temperature is not injurious to catalyst activity or catalyst life and providing the air necessary to attain this temperature is not excessive. It will be understood of course that my stripping chamber as well as my regeneration chamber may be fabricated from or lined with firebrick or other material capable of withstanding the high temperatures.

While I have disclosed the use of air from line 40 in the above specific example it should be understood that the gas introduced through line 40 may be either higher or lower in oxygen content than air itself. In some instances it may be feasible and desirable to employ commercial oxygen gas itself, which may be introduced through line 40', particularly when such gas is readily available and the catalyst is capable of withstanding the high temperatures that would be produced by the use of oygen per se. The use of oxygen per se of course results in the production of considerably more heat per unit volume of gas or in a considerably less volume of combustion product gases per unit amount of heat. To obtain the necessary amount of combustion products to keep the catalyst in the stripping zone in properly aerated condition and/or to avoid excessively high temperatures may require the use of an admixture of air and oxygen. Generally speaking the oxygen concentration of the gas introduced at the base of the stripper should be in the range of about 5% to 100%; an oxygen concentration of about 20% (i. e. air) being preferred under most conditions. The use of air only necessitates a small branch line leading from the discharge side of the conventional air compressor to the base of the stripper. I prefer to provide at the base of the stripping zone about 1 to 5 volumes of combustion products per volume of catalyst material passing downwarly through the stripper. The combustion gases may all pass downwardly with the catalyst although a large part of them may pass upwardly through the stripper at a velocity of the order of about 0.1 to 1 foot per second.

With the use of steam as the stripping agent with other conditions as indicated in the above-specific example, the absorber overhead discharged through line 35 amounted to approximately 6.3 weight percent based on charging stock so that approximately 2000 to 3000 cubic feet per minute of tail gases were discharged through line 35 of which upwards of 20% constituted non-hydrocarbon gases. When introducing compressed air into the base of the stripper as hereinabove described the amount of gases removed at this point may be somewhat higher. However, the overall increase in efficiency, the increased product recovery, the decrease in air compression requirements and the lowered regeneration load outweigh any incremental increase in the amount of gases which must be handled in the recovery system.

In Figure 2 I have illustrated a system wherein the stripping section 39a is beneath reactor 15a and wherein the incoming charging stock in regenerated catalyst stream enters through line 14a terminating in a cone provided with distributor grid 16a. This is merely to illustrate an alternative reactor-stripper arrangement and it will be obvious that many other reactor-stripper arrangements may be employed. The stripper itself may be simply an open elongated conduit but it is preferably provided with vertical baffles for subdividing the downwardly flowing catalyst into separate streams thereby attaining a better countercurrent effect and avoiding the degree of turbulent mixing which characterizes the fluidized catalyst in the reactor and the regenerator. Alternatively the stripper may be of the countercurrent type specifically described in U. S. Patent 2,367,694.

In Figure 3 the stripper 37b is laterally disposed adjacent reactor 15b and catalyst solids flow from the reactor to the stripper through conduit 38b. In this case the stripped products do not pass through the reaction zone but are taken overhead through line 49 and cooler-condenser 50 to separator 51. The condensed liquids together with any entrained solids may be withdrawn through line 52 and introduced for example into scrubbing zone 20. Gases are withdrawn from separator 51 through line 53 and any condensible hydrocarbons therein may be separately recovered or utilized without imposing any increased load on the recovery system for products discharged from reactor 15b.

While I have disclosed in minute detail a specific example of my invention, said example is by way of illustration and not by way of limitation. The invention is applicable to any and all conversion and regeneration conditions, the conversion temperatures for catalytic cracking usually being within the range of 800 to 1000° F., catalyst-to-oil ratios usually being within the range of 1:1 to 30:1, space velocities being within the range of 0.2 to 5 and catalyst residence time in the reactor usually being in the range of about 1 to 60 minutes or more. Regeneration temperatures may likewise vary through a considerable range depending on the nature of the particular catalyst, temperatures in the range of about 1000 to 1100° F. being usually preferred. Other hydrocarbon conversion processes will of course employ widely different conversion conditions all of which are well known to those skilled in the art and hence require no detailed description. Thus other modifications and arrangements of the conversion system itself and alternative operating conditions will be apparent to those skilled in the art from the above-detailed description.

I claim:

1. In a catalytic conversion system wherein catalyst in a conversion zone accumulates carbonaceous deposits comprising vaporizable hydrocarbons, wherein the catalyst from the conversion zone is stripped for removal of the vaporizable hydrocarbons in a stripping zone and wherein the catalyst is thereafter regenerated by burning unvaporized carbonaceous residue therefrom, the improved method of operation which comprises effecting said stripping solely by heating the base of the stripping zone to a temperature substantially higher than the temperature in the conversion zone and sufficiently high to establish a temperature gradient from a lower portion to an upper portion of the stripping zone, passing the catalyst contaminated with said carbonaceous deposits downwardly through said stripping zone whereby the carbonaceous deposits are subjected to increasing temperatures in its downward passage, vaporizing vaporizable components from residual components of said deposits as the catalyst passes downwardly through the stripping zone, passing the vaporized components upwardly through at least the upper portion of the stripping zone, condensing and recovering at least a substantial portion of said vaporized components, effecting said heating by introducing a gas containing at least about 20% of free oxygen at the base of said stripping zone for effecting partial combustion of said residual components and employing an amount of said gas which is sufficiently large to maintain the catalyst in fluidized condition at the base of said stripping zone but sufficiently small so that most of the products of said partial combustion are carried downwardly with said catalyst from the base of the stripping zone.

2. The method of claim 1 in which the gas comprising free oxygen is air.

3. The method of claim 1 which includes the step of condensing and recovering products from the conversion zone in steps which are separate and distinct from the condensing and recovering of vaporized components from the stripping zone.

PAUL F. McELHERNE.

REFERENCES CITED

The following references are of record in the file of this patent:

UNITED STATES PATENTS

| Number | Name | Date |
|---|---|---|
| 2,273,076 | Voorhees | Feb. 17, 1942 |
| 2,311,564 | Munday | Feb. 16, 1943 |
| 2,320,273 | Gohr | May 25, 1943 |
| 2,382,472 | Frey | Aug. 14, 1945 |
| 2,385,326 | Bailey, Jr. | Sept. 25, 1945 |
| 2,391,944 | Carlsmith | Jan. 1, 1946 |
| 2,408,943 | Mekler | Oct. 8, 1946 |